(12) United States Patent
Dolganow et al.

(10) Patent No.: US 8,264,965 B2
(45) Date of Patent: Sep. 11, 2012

(54) IN-BAND DPI APPLICATION AWARENESS PROPAGATION ENHANCEMENTS

(75) Inventors: Andrew Dolganow, Kanata (CA); Steven Edward Morin, Ottawa (CA); Colin Leon Kahn, Morris Plains, NJ (US)

(73) Assignee: Alcatel Lucent, Paris (FR)

( * ) Notice: Subject to any disclaimer, the term of this patent is extended or adjusted under 35 U.S.C. 154(b) by 384 days.

(21) Appl. No.: 12/076,701

(22) Filed: Mar. 21, 2008

(65) Prior Publication Data

US 2009/0238192 A1 Sep. 24, 2009

(51) Int. Cl.
*H04L 12/26* (2006.01)
*H04L 12/56* (2006.01)

(52) U.S. Cl. ............ 370/237; 370/235; 370/395.43

(58) Field of Classification Search ............ None
See application file for complete search history.

(56) References Cited

U.S. PATENT DOCUMENTS

| | | | | |
|---|---|---|---|---|
| 6,363,477 | B1 * | 3/2002 | Fletcher et al. | 713/151 |
| 6,426,943 | B1 * | 7/2002 | Spinney et al. | 370/235 |
| 7,299,282 | B2 * | 11/2007 | Sarkissian et al. | 709/224 |
| 7,362,763 | B2 * | 4/2008 | Wybenga et al. | 370/395.1 |
| 7,463,633 | B2 * | 12/2008 | Endo et al. | 370/395.1 |
| 7,606,147 | B2 * | 10/2009 | Luft et al. | 370/229 |
| 7,606,243 | B2 * | 10/2009 | Takabatake et al. | 370/401 |
| 2003/0206523 | A1 * | 11/2003 | Lu | 370/231 |
| 2004/0139313 | A1 * | 7/2004 | Buer et al. | 713/150 |
| 2006/0233100 | A1 | 10/2006 | Luft et al. | |
| 2007/0011317 | A1 | 1/2007 | Brandyburg et al. | |
| 2007/0058632 | A1 | 3/2007 | Back et al. | |
| 2007/0162289 | A1 * | 7/2007 | Olsson et al. | 705/1 |
| 2008/0077724 | A1 * | 3/2008 | Sarangam et al. | 710/264 |
| 2008/0192763 | A1 * | 8/2008 | Davis et al. | 370/412 |
| 2008/0214189 | A1 * | 9/2008 | Taaghol | 455/432.2 |
| 2008/0229415 | A1 * | 9/2008 | Kapoor et al. | 726/22 |
| 2009/0003233 | A1 * | 1/2009 | Dugan et al. | 370/252 |

FOREIGN PATENT DOCUMENTS

| | | |
|---|---|---|
| CA | 2604628 A1 | 10/2006 |
| CA | 2620349 A1 | 3/2007 |
| EP | 1869826 A1 | 12/2007 |
| EP | 1932312 A1 | 6/2008 |
| WO | WO2006/108282 A1 | 10/2006 |
| WO | WO2007030917 A1 | 3/2007 |

* cited by examiner

*Primary Examiner* — Chi Pham
*Assistant Examiner* — Soon-Dong Hyun
(74) *Attorney, Agent, or Firm* — Kramer & Amado P.C.

(57) ABSTRACT

Various exemplary embodiments are a method and related device and computer-readable medium including one or more of the following: receiving a packet sent from the source node to the destination node; associating the packet with an active flow by accessing information in the packet; performing deep packet inspection (DPI) to identify an application associated with the active flow; associating application-identifying information with the packet; forwarding the packet including the application-identifying information towards the destination node; and performing application-specific processing at a downstream device on at least one packet belonging to the active flow, the downstream device identifying the application associated with the active flow by extracting the application-identifying information from the packet.

21 Claims, 3 Drawing Sheets

IN-BAND DPI APPLICATION AWARENESS PROPAGATION ENHANCEMENTS

FIELD OF THE INVENTION

This invention relates generally to communication of information regarding applications associated with data packets.

DESCRIPTION OF RELATED ART

As streaming video, peer-to-peer networking, and other high bandwidth applications become the norm, the burdens placed on the underlying network architecture increase exponentially. When designing the congestion management systems, service providers did not contemplate the use of the Internet for streaming video, peer-to-peer applications, and other high bandwidth uses. As a result, when a large number of users run high-bandwidth applications, the best effort, high-oversubscription rate architecture frequently experiences congestion, thereby interfering with the user experience.

These problems are particularly salient in the context of mobile networks, where bandwidth is even more limited. Mobile networks are seeing a gradual transformation from voice-only services to data or mixed voice-data services. As per-user bandwidth requirements have increased, the burdens placed on the mobile network architecture have also increased.

Service providers, particularly mobile network service providers, must therefore decide between several options: continue providing best effort service; increase bandwidth and essentially become a transport "utility"; or sell application-specific services based on the requirements of the individual users. Service providers view the first two options as unsatisfactory, as users are dissatisfied with best effort service, while indiscriminately increasing bandwidth would result in additional costs to the service provider with no corresponding increase in revenue. Selling application-specific services, on the other hand, would allow users to pay for the services they desire to receive, while eliminating the need for the service provider to exponentially increase bandwidth.

In order to sell application-specific services, however, service providers must first modify the underlying network architecture to identify and gather information about applications. In the radio portion of mobile networks, the use of per-application traffic management is especially critical, as bandwidth is limited due to the inherent restrictions of radio frequencies. Consequently, mobile operators frequently utilize packet marking, such as Type of Service (ToS) marking to prioritize and forward packets.

In existing mobile network architectures, however, the network relies on end-user equipment for proper marking of packets. Thus, for example, a user's mobile handset could mark voice packets as having a higher priority than data packets, thereby ensuring the quality of calls placed over the mobile network.

In these current implementations, because the network relies on end-user equipment to mark packets, the mobile network cannot effectively prioritize packets without involvement of end-user equipment supported by the mobile network. In addition, because values must be predefined and implemented in the end-user equipment, the mobile network operator lacks the flexibility to define new applications and markings without modifying the behavior of the end-user equipment. Furthermore, current implementations rely on packet marking protocols that include only a limited number of unique values, such that the network can effectively manage only a small number of applications.

Accordingly, there is a need for an in-line device that identifies applications associated with data packets and conveys this information for downstream processing. There is also a need for associating application-identifying information with data packets without requiring the packet to be marked at end-user equipment. In addition, there is a need for packet marking in a mobile network that utilizes a packet marking scheme such that a large number of applications may be identified at any location in the network, without requiring Deep Packet Inspection (DPI) processing to be performed at each location.

The foregoing objects and advantages of the invention are illustrative of those that can be achieved by the various exemplary embodiments and are not intended to be exhaustive or limiting of the possible advantages which can be realized. Thus, these and other objects and advantages of the various exemplary embodiments will be apparent from the description herein or can be learned from practicing the various exemplary embodiments, both as embodied herein or as modified in view of any variation that may be apparent to those skilled in the art. Accordingly, the present invention resides in the novel methods, arrangements, combinations, and improvements herein shown and described in various exemplary embodiments.

SUMMARY OF THE INVENTION

In light of the present need for in-band DPI application awareness propagation enhancements, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

In various exemplary embodiments, a DPI device is placed in-line in a non-mobile portion of a mobile network, such that packets pass through the DPI device prior to being forwarded. Thus, in various exemplary embodiments, the DPI device identifies and classifies traffic passing through the mobile network based on information extracted from the header and/or data portion of the incoming packets. Using the information extracted from the packets, the DPI device may add application-identifying information to the packets, thereby allowing downstream devices to identify the application and perform application-specific processing.

Accordingly, in various exemplary embodiments, a method of processing packets sent from a source node to a destination node and a related computer-readable medium encoded with instructions comprise: receiving a packet sent from the source node to the destination node; associating the packet with an active flow by accessing information in the packet; performing deep packet inspection (DPI) to identify an application associated with the active flow; associating application-identifying information with the packet; forwarding the packet including the application-identifying information towards the destination node; and performing application-specific processing at a downstream device on at least one packet belonging to the active flow, the downstream device identifying the application associated with the active flow by extracting the application-identifying information from the packet.

In various exemplary embodiments, the packet is an IP packet and the application-identifying information is placed in a header extension of the IP packet. Alternatively, in various exemplary embodiments, the packet is formatted according to a proprietary protocol and the application-identifying information is placed in a proprietary protocol extension of the packet. In addition, in various exemplary embodiments, the packet is a Generic Routing Encapsulation (GRE) packet and the application-identifying information is placed in a key field or sequence number field of the GRE packet.

Furthermore, in various exemplary embodiments, a device for processing traffic in a network comprises: a communication module that receives and forwards a packet sent from a source node to a destination node; and a processor configured to identify an active flow associated with the packet by accessing information stored in the packet, perform deep packet inspection (DPI) to identify an application associated with the active flow, and associate application-identifying information with the packet, wherein the application-identifying information is extracted from the packet by a downstream device to identify the application associated with the active flow.

BRIEF DESCRIPTION OF THE DRAWINGS

In order to better understand various exemplary embodiments, reference is made to the accompanying drawings, wherein.

DETAILED DESCRIPTION OF THE PREFERRED EMBODIMENTS OF THE INVENTION

Figure 1:
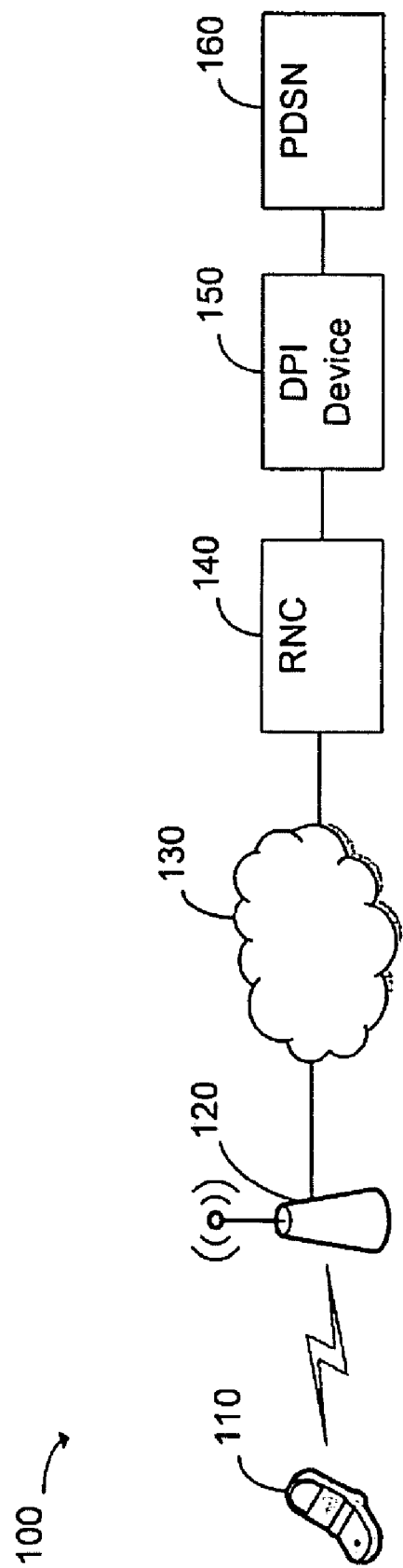
FIG. 1 is a schematic diagram of an exemplary mobile network utilizing in-line DPI in a mobile part of a network.

Referring now to the drawings, in which like numerals refer to like components or steps, there are disclosed broad aspects of various exemplary embodiments.

FIG. 1 is a schematic diagram of an exemplary mobile network 100 utilizing in-line DPI in a mobile part of the network 100. Exemplary mobile network 100 includes user node 110, wireless base station 120, network 130, radio network controller 140, deep packet inspection device 150, and packet data serving node 160.

In various exemplary embodiments, user node 110 is a device operated by a user that enables access to mobile network 100. More specifically, in various exemplary embodiments, user node 110 is a cell phone, personal digital assistant, personal or laptop computer, wireless email device, or any other device that supports wireless communications. Furthermore, in various exemplary embodiments, user node 110 generates and sends data packets related to one or more applications.

In various exemplary embodiments, wireless base station 120 is a device including an antenna to wirelessly exchange data with user node 110 over a plurality of radio channels. Furthermore, wireless base station 120 includes a wire line interface to forward data into network 130. Thus, in various exemplary embodiments, wireless base station 120 is a Node B in a 3G network or another base transceiver station communicating in a Global System for Mobile Communications (GSM), Universal Mobile Telecommunications System (UMTS), Long Term Evolution (LTE), or other wireless network.

Additionally, in various exemplary embodiments, network 130 provides a connection between wireless base station 120 and radio network controller 140. It should be apparent that network 130 may be any network capable of sending data and requests between wireless base station 120 and radio network controller 140. Accordingly, network 130 may comprise a plurality of routers, switches, bridges, and other components suitable for receiving and forwarding data packets.

In various exemplary embodiments, radio network controller 140 controls and manages a plurality of wireless base stations 120. Thus, radio network controller 140 directs the transmission and reception of data in wireless base station 120 by controlling the radio transmitters and receivers in wireless base station 120. Furthermore, in various exemplary embodiments, radio network controller 140 receives and transmits packet-switched data between wireless base station 120 and packet data serving node 160. It should be apparent that radio network controller 140 may be replaced by a base station controller or another device capable of directing the operation of wireless base station 120 and receiving and transmitting data packets.

In various exemplary embodiments, radio network controller 140 utilizes application information inserted into a data packet by deep packet inspection device 150 to manage the flow of data. More particularly, in various exemplary embodiments, radio network controller 140 identifies the application using application-identifying information inserted by DPI device 150 and performs quality of service processing, such as determining whether to allow or drop the packet.

In addition, in various exemplary embodiments, mobile network 100 includes a deep packet inspection device 150 that intercepts, "sniffs," or otherwise receives packets transmitted from radio network controller 140 to packet data switching node 160 or from packet data switching node 160 to radio network controller 140. More specifically, as described further below with reference to FIG. 4, DPI device 150 receives a packet, identifies an application associated with the packet, and adds a marking or other information to the packet to allow downstream application-specific processing and forwarding.

In various exemplary embodiments, DPI device 150 comprises specialized hardware and/or software that is capable of examining data packets received from and/or sent to radio network controller 140 to identify information associated with the packets. Thus, in various exemplary embodiments, DPI device 150 includes a storage medium that stores information used to identify flows, a processor for performing analysis, and a communication module to receive and transmit packets.

In addition, in various exemplary embodiments, DPI device 150 is integrated into radio network controller 140, packet data switching node 160, or into a network element that is part of a network (not shown) providing connectivity between radio network controller 140 and packet data switching node 160. In various exemplary embodiments, the network providing connectivity comprises a plurality of routers, switches, bridges, and other components suitable for receiving and forwarding data packets. Alternatively, in various exemplary embodiments, DPI device 150 is placed or integrated into wireless base station 120 or a network element that is part of network 130.

In various exemplary embodiments, DPI device 150 examines any combination of information in layers 2 through 7 of the Open Systems Interconnection (OSI) model. Thus, in various exemplary embodiments, DPI device 150 performs a "deep" analysis of one or more packets in order to identify an application associated with the packets. For example, DPI device 150 may analyze a packet to determine whether the packet relates to email, streaming video, web browsing, peer-to-peer transfer, or any other application of interest to the service provider. Furthermore, in various exemplary embodiments, DPI device 150 performs traffic management operations, then forwards the packet to packet data serving node 160 or to radio network controller 140.

It should be apparent, that although illustrated as a standalone device, in various exemplary embodiments, DPI device 150 is a component integrated into a router. Thus, in various exemplary embodiments, DPI device 150 analyzes each packet received by the router before the router forwards the packet to the next hop.

Furthermore, it should be apparent that DPI device 150 is illustrated as directly connected to radio network controller 140 and packet data serving node 160 for the sake of simplicity. Accordingly, in various exemplary embodiments, one or more switches, routers, bridges, or other network elements are placed between DPI device 150 and radio network controller 140 or packet data serving node 160.

In various exemplary embodiments, packet data serving node 160 serves as a connection between mobile network 100 and one or more EP networks (not shown). Thus, in various exemplary embodiments, packet data serving node 160 forwards packets between the Internet and radio network controller 140. It should be apparent that packet data serving node 160 may be replaced by a Gateway General Packet Radio Service Support Node (GGSN), a Serving Gateway General Packet Radio Service Support Node (SGSN), Access Serving Gateway (LTE), or any other node capable of providing a connection between mobile network 100 and an IP network.

In various exemplary embodiments, packet data serving node 160 utilizes application information inserted into a data packet by deep packet inspection device 150 to manage the flow of data. More particularly, in various exemplary embodiments, packet data serving node 160 identifies the application using information found in the data packet and performs quality of service processing, such as determining whether to allow or drop the packet.

It should be apparent that, although illustrated as a 3G wireless mobile network, network 100 may be a different type network. Thus, in various exemplary embodiments, network 100 is a cellular network operating under a different standard, a satellite network, a wired network, or some other type of network in which application-specific processing is desired.

Figure 2:
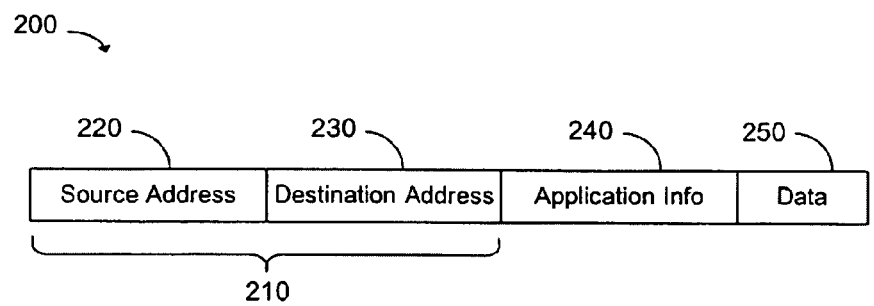
FIG. 2 is a schematic diagram of an exemplary L3 packet including a field for storing application information.

FIG. 2 is a schematic diagram of an exemplary L3 packet 200 including one or more fields for storing application information. In various exemplary embodiments, L3 packet 200 includes, among, other fields, packet header 210, source address 220, destination address 230, application information 240, and data 250.

In various exemplary embodiments, packet header 210 includes data used to forward packet 200 from a source to a destination. Thus, in various exemplary embodiments, packet header 210 includes a source address field 220, which may include a source IP address and a source port. Furthermore, in various exemplary embodiments, packet header 210 includes destination address field 230, which may include a destination IP address and a destination port.

Furthermore, packet 200 includes application information 240, which, in various exemplary embodiments, identifies an application associated with packet 200. In various exemplary embodiments, application information 240 is placed into an IP header extension, which may be an additional header inserted between packet header 210 and data 250 of packet 200. Thus, in various exemplary embodiments, application information 240 consists of one or more type length values (TLV) indicating a name, alphanumerical identifier, or other information identifying an application associated with packet 200. It should be apparent that any information suitable for identifying the application may be placed in application information 240.

Furthermore, it should be apparent that packet header 210 is shown as including only source address field 220 and destination address field 230 for the sake of simplicity. Thus, in various exemplary embodiments, packet header 210 includes additional fields including, but not limited to, a protocol number, traffic class, flow label, payload length, next header, and hop limit. Furthermore, it should be apparent that packet 200 may be an IP packet, Transmission Control Protocol (TCP) packet, User Datagram Protocol (UDP) packet, a packet formatted according to a proprietary protocol, or a packet formatted in any other protocol that may be modified to include application information.

Figure 3:
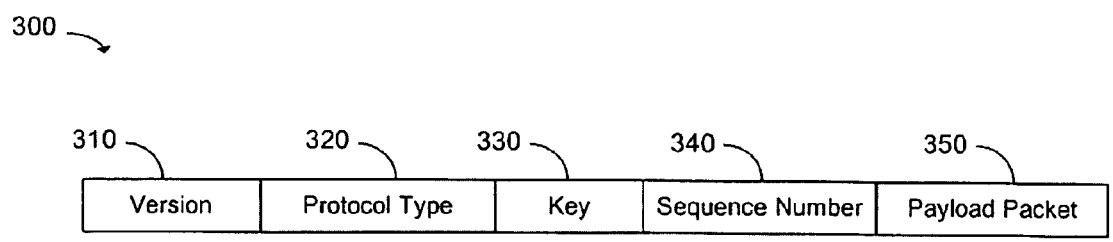
FIG. 3 is a schematic diagram of an exemplary GRE packet including key and sequence number fields.

FIG. 3 is a schematic diagram of an exemplary Generic Routing Encapsulation packet 300 including key and sequence number fields. GRE is a tunneling protocol used to encapsulate network layer packets inside of an IP tunneling packet. Thus, in various exemplary embodiments, GRE packet 300 includes, among other fields, version 310, protocol type 320, key 330, sequence number 340, and payload packet 350.

GRE packet 300 includes version 310, which specifies a GRE protocol version with which the packet is associated. Furthermore, GRE packet 300 includes protocol type 320, which specifies the underlying protocol used for the packet encapsulated as payload packet 350.

In addition, in various exemplary embodiments, GRE packet 300 includes key 330, which is a field inserted by the device or party that performs the encapsulation. Thus, in various exemplary embodiments, prior to forwarding packet 300, DPI device 150 inserts application information into key 330. Accordingly, devices or parties that receive packet 300 downstream may extract the application information from key 330 and perform application-specific processing based on the identified application.

Furthermore, in various exemplary embodiments, GRE packet 300 includes sequence number 340, which is a field inserted by the device or party that performs the encapsulation. Sequence number 340 may be used to establish the order in which packets have been transmitted to the receiving device. Alternatively, in various exemplary embodiments, prior to forwarding packet 300, DPI device 150 inserts application information into sequence number 340. Accordingly, devices or parties that receive packet 300 downstream may extract the application information from sequence number 340 and perform application-specific processing based on the identified application.

In various exemplary embodiments, GRE packet 300 also includes payload packet 350, which stores a packet that is encapsulated and routed. Accordingly, information contained in a delivery header (not shown) is used to forward packet 300 from a source node to a destination node, while ignoring the routing information contained in payload packet 350.

Figure 4:
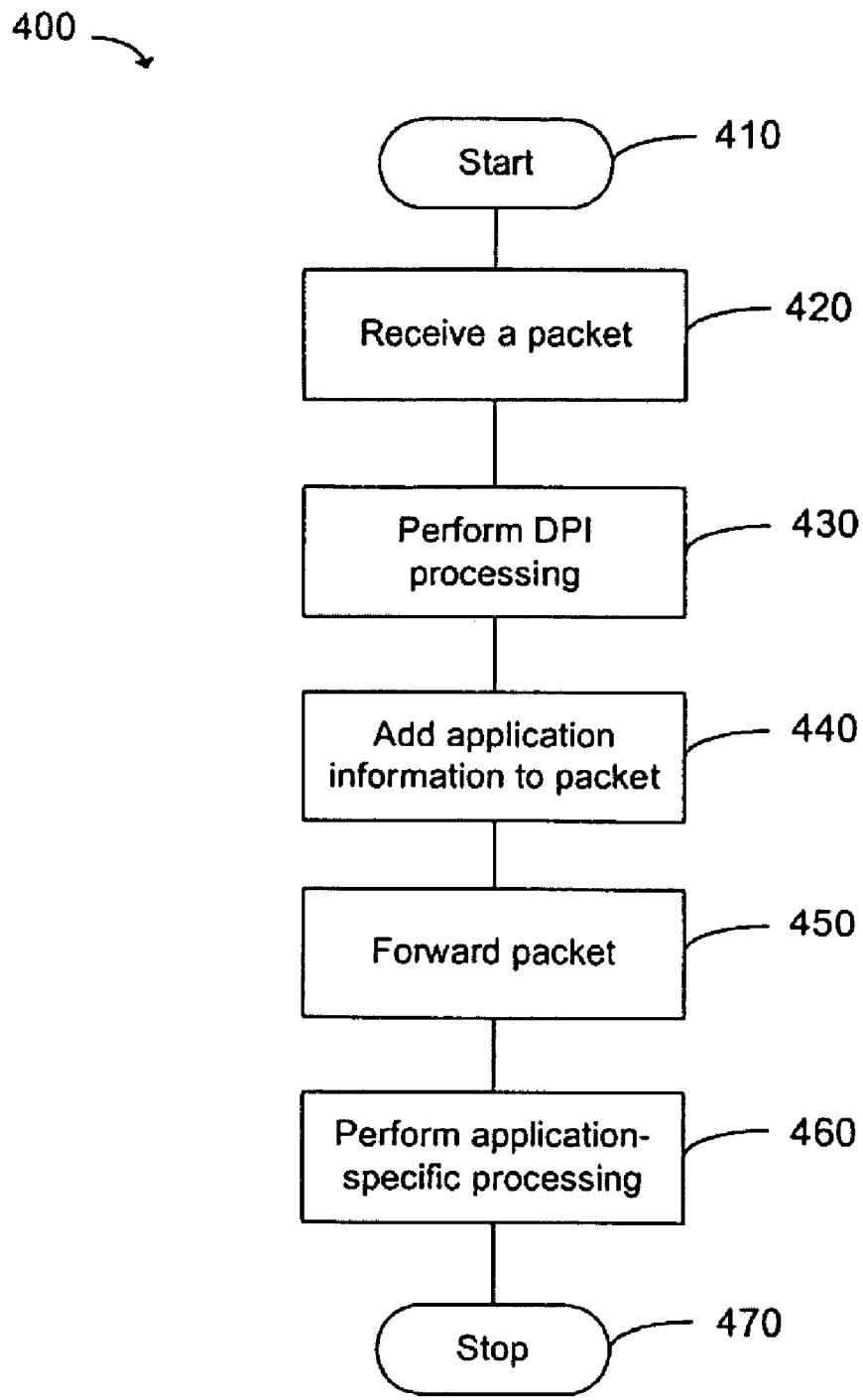
FIG. 4 is a flowchart of an exemplary embodiment of a method for implementing in-band DPI application awareness propagation enhancements.

FIG. 4 is a flowchart of an exemplary embodiment of a method 400 for implementing in-band DPI application awareness propagation enhancements. Exemplary method starts in step 410 and proceeds to step 420, where DPI device 150 intercepts, sniffs, or otherwise receives a packet transmitted from a source node to a destination node.

Exemplary method 400 then proceeds to step 430, where DPI device 150 identifies a flow associated with the packet using header information from the packet, then performs DPI processing on the identified flow. Thus, in various exemplary embodiments, DPI device 150 examines any combination of information in OSI layers 3 through 7 of one or more packets to identify an application associated with the flow. For example, DPI device 150 may analyze one or more packets to determine whether the flow relates to email, streaming video, web browsing, peer-to-peer transfer, Voice over IP (VoIP), or any other application of interest to the service provider. In various exemplary embodiments, the analysis performed by DPI device 150 includes at least one of signature and pattern matching, stateful monitoring, behavioral analysis, and statistical analysis.

After performing DPI processing in step 430, exemplary method 400 proceeds to step 440, where DPI device 150 adds application information to the packet. Thus, in various exemplary embodiments, DPI device 150 adds an alphanumeric value identifying the application associated with the flow. More particularly, DPI device 150 may add an application identifier to an IP header extension or a proprietary protocol extension. Alternatively, DPI device 150 may add the application identifier to at least one of a key field and a sequence number field of a GRE packet header. It should be apparent that, in various exemplary embodiments, DPI device 150 adds the application identifier to any field in the packet, provided that a downstream device may extract the application information.

After DPI device 150 adds application information to the packet in step 440, exemplary method 400 proceeds to step 450, where DPI device 150 forwards the packet. Thus, in various exemplary embodiments, DPI device 150 extracts routing information from the packet and sends the packet based on the extracted routing information.

Exemplary method 400 then proceeds to step 460, where a downstream device receives the packet containing application information and performs application-specific processing. It should be apparent that, in various exemplary embodiments, the downstream device may be a radio network controller, packet data serving node, or any other network element at which application-specific processing is desired. Thus, in various exemplary embodiments, the downstream device receives the packet, extracts the application information from the packet, and identifies the application corresponding to the application information.

In various exemplary embodiments, this application-specific processing includes traffic management operations. Accordingly, the downstream device may access a service level agreement associated with the subscriber located at the source node to determine how to treat packets in the identified flow. Based on this determination, the downstream device may determine how to treat the packet, including whether to allow the packet to proceed or whether the packet should instead be dropped. Alternatively, the downstream device may associate a Quality of Service (QoS) marking with the packets, such as a Differentiated Services Code Point (DSCP).

For example, the downstream device may determine that the flow corresponds to streaming video and that the subscriber located at the source node has paid an additional fee to receive a high quality of service for such transfers. Accordingly, the downstream device may mark the packet with a higher DSCP value to indicate that the packet should be given high priority. Alternatively, the downstream device may determine that the flow is associated with a peer-to-peer transfer and that the subscriber is only paying for a base level of service. Accordingly, the downstream device may mark the packets in the flow with a value indicating that the packet should be given a lower priority.

It should be apparent that although described with reference to marking and dropping packets, the downstream device may perform any application-specific processing. Thus, the downstream device may, for example, drop packets, collect statistics, and manage billing. After performing application-specific processing in step 460, exemplary method 400 proceeds to step 470, where exemplary method 400 stops.

According to the forgoing, various exemplary embodiments include a DPI device that identifies and analyzes a flow, and adds application information to the packet. Furthermore, in various exemplary embodiments, the DPI device forwards the packet along with the application information to a downstream node. Accordingly, in various exemplary embodiments, a downstream device may identify an application to provide a high-level application-specific service, without the need for the downstream device to perform additional DPI processing.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method of processing packets sent from a source node to a destination node, the method comprising:
   receiving a packet sent from the source node to the destination node;
   associating the packet with an active flow by accessing information in the packet;
   performing deep packet inspection (DPI) to identify an application associated with the active flow;
   inserting application-identifying information into the packet;
   forwarding the packet including the application-identifying information towards the destination node, such that a downstream device is enabled to perform application-specific processing on at least one packet belonging to the active flow and to identify the application associated with the active flow by extracting the application-identifying information from the packet.

2. The method of processing packets sent from a source node to a destination node according to claim 1, wherein the packet is an IP packet.

3. The method of processing packets sent from a source node to a destination node according to claim 2, further comprising:
   placing the application-identifying information in a header extension of the IP packet.

4. The method of processing packets sent from a source node to a destination node according to claim 1, further comprising:
   formatting the packet according to a proprietary protocol.

5. The method of processing packets sent from a source node to a destination node according to claim 4, further comprising:
   placing the application-identifying information in a proprietary protocol extension of the packet.

6. The method of processing packets sent from a source node to a destination node according to claim 1, wherein the packet is a Generic Routing Encapsulation (GRE) packet.

7. The method of processing packets sent from a source node to a destination node according to claim 6, further comprising:
   placing the application-identifying information in a key field of the GRE packet.

8. The method of processing packets sent from a source node to a destination node according to claim 6, further comprising:
   placing the application-identifying information in a sequence number field of the GRE packet.

9. The method of processing packets sent from a source node to a destination node according to claim 1, wherein the step of performing DPI to identify an application associated with the active flow comprises at least one of signature matching, pattern matching, stateful monitoring, behavioral analysis, and statistical analysis.

10. The method of processing packets sent from a source node to a destination node according to claim 1, wherein the step of performing application-specific processing at a downstream device further comprises:
    performing a traffic management function on the at least one packet belonging to the active flow.

11. The method of processing packets sent from a source node to a destination node according to claim 10, wherein the traffic management function comprises modifying a quality of service associated with the at least one packet belonging to the active flow.

12. A device for processing traffic in a network, the device comprising:
    a communication module that receives and forwards a packet sent from a source node to a destination node; and
    a processor that:
        identifies an active flow associated with the packet by accessing information stored in the packet,
        performs deep packet inspection (DPI) to identify an application associated with the active flow, and
        inserts application-identifying information into the packet, wherein the application-identifying information is capable of being extracted from the packet by a downstream device to identify the application associated with the active flow.

13. The device for processing traffic in a network according to claim 12, wherein the packet is an IP packet.

14. The device for processing traffic in a network according to claim 13, wherein the application-identifying information is placed in a header extension of the IP packet.

15. The device for processing traffic in a network according to claim 12, wherein the packet is formatted according to a proprietary protocol.

16. The device for processing traffic in a network according to claim 15,
    wherein the application-identifying information is placed in a proprietary protocol extension of the packet.

17. The device for processing traffic in a network according to claim 12, wherein the packet is a Generic Routing Encapsulation (GRE) packet.

18. The device for processing traffic in a network according to claim 17, wherein the application-identifying information is placed in a key field of the GRE packet.

19. The device for processing traffic in a network according to claim 17,
    wherein the application-identifying information is placed in a sequence number field of the GRE packet.

20. A non-transitory computer-readable storage medium encoded with instructions for processing packets sent from a source node to a destination node, the computer readable medium comprising:
    instructions for receiving a packet sent from the source node to the destination node;
    instructions for associating the packet with an active flow by accessing information in the packet;
    instructions for performing deep packet inspection (DPI) to identify an application associated with the active flow;
    instructions for inserting application-identifying information into the packet;
    instructions for forwarding the packet including the application-identifying information towards the destination node such that a downstream device is enabled to perform application-specific processing on at least one packet belonging to the active flow and to identify the application associated with the active flow by extracting the application-identifying information from the packet.

21. A method of processing packets sent from a source node to a destination node, the method comprising:
    receiving a packet sent from the source node to the destination node;
    associating the packet with an active flow by accessing information in the packet;
    performing deep packet inspection (DPI) to identify an application associated with the active flow;
    inserting, with a DPI device, application-identifying information into the packet, wherein a downstream device may subsequently extract the inserted application-identifying information;
    forwarding the packet including the application-identifying information towards the destination node such that the downstream device is enabled to perform application-specific processing on at least one packet belonging to the active flow and to identify the application associated with the active flow by extracting the application-identifying information from the packet.

* * * * *